United States Patent [19]

Yoshizaki et al.

[11] 4,374,385
[45] Feb. 15, 1983

[54] METHOD OF FORMING GRADATED IMAGES BY THERMAL PRINTER AND THERMAL HEAD FOR THERMAL PRINTERS

[75] Inventors: Osamu Yoshizaki, Fussa; Masayuki Inai, Hachioji, both of

[73] Assignee: Konishiroku Photo Industry Co., Ltd., Tokyo, Japan

[21] Appl. No.: 220,805

[22] Filed: Dec. 29, 1980

[30] Foreign Application Priority Data

Dec. 27, 1979 [JP] Japan .................................. 54-171913
Dec. 27, 1979 [JP] Japan .................................. 54-171914
Dec. 27, 1979 [JP] Japan .......................... 54-185050[U]

[51] Int. Cl.³ ...................... G01D 15/16; G01D 15/10
[52] U.S. Cl. ................................. 346/1.1; 346/76 PH
[58] Field of Search ..................... 346/76 PH, 1.1; 219/216

[56] References Cited

U.S. PATENT DOCUMENTS 4,074,109 2/1978 Baraff et al. .............. 346/76 PH X
4,251,822 2/1981 Hara et al. ................ 346/76 PH X

*Primary Examiner*—Stafford D. Schreyer
*Attorney, Agent, or Firm*—James E. Nilles

[57] ABSTRACT

A method of forming a gradated image by using a thermal printer wherein a thermal head having a plurality of lined-up heating elements scans in one direction and the surface of thermal paper is fed in a secondary scanning direction intermittently and synchronously with the scanning movement of the thermal head. The method comprising the steps of setting a feed amount of the thermal paper to a level which is not greater than ½ of the length of arrangement of the heating elements, advancing the thermal paper to the position where the sections formed between the preceding printing sections become the subsequent printing sections. New image element information is given to such heating elements that are not opposed to the sections formed between the preceding printing section of the thermal paper while giving to such heating elements that are opposed to the sections formed between the preceding printing section of the thermal paper image element information which is the same as the already-printed image element information in an adjacent heating element. The heating elements are actuated by modulated signals, which are made by modulating a signal representative of the density of an image to a plurality of pulse signals having a pulse width sufficiently smaller than the pulse width of the pulse current. A thermal head for thermal printers having a plurality of heating elements provided on a substrate is further disclosed.

3 Claims, 6 Drawing Figures

METHOD OF FORMING GRADATED IMAGES BY THERMAL PRINTER AND THERMAL HEAD FOR THERMAL PRINTERS

BACKGROUND OF THE INVENTION

1. Field of the Invention

This invention relates to a method of forming two-dimensional gradated images by using a thermal printer, and to thermal head for thermal printers.

2. Description of the Prior Art

There are a dry silver process and a discharge breaking system which are known as methods of recording a gradated video signal as a two-dimensional image but these methods have both merits and demerits.

In the dry silver systems, an image of non-stepped gradation can be obtained but the image is readily affected by an ambient temperature. Consequently, it is difficult to record an image of a uniform quality.

In the discharge breaking system, an image of a comparatively uniform quality is easily obtained but an image of over eight-stepped gradation cannot be obtained. It is difficult to improve the resolving power in this system.

A known thermal printer used to record letters and figures permits reproducing an image of a substantially non-stepped gradation and does not require a developing step. Consequently, there is the possibility that a two-dimensional gradated image is recorded by such a printer. The thermal printer referred to above includes a thermal head C as shown in FIG. 2, which consists of a ceramic substrate A and a plurality of heating elements lined up on the surface of the substrate A. This thermal head C traverses the surface of thermal paper D in a primary scanning direction X as shown in FIG. 1. Synchronously with the scanning movement of the thermal head C, the thermal paper D is fed intermittently in a secondary scanning direction Y by a distance slightly greater than length $L_1$ of arrangement of the heating elements B.

The inventors have discussed the recording of a two-dimensional image of a high gradation by a thermal printer of the above-mentioned construction, to find out that what does not cause any trouble in the recording of letters and figures hampers the recording of a two-dimensional image of a high gradation.

When a two dimensional gradated image is formed by inputting a video signal into a thermal printer mentioned above, transversely extended, parallel, white lines are drawn on such portions of the surface of thermal paper D that are opposed to spaces P among heating elements B, and also on such portions of the thermal paper D that correspond to positions where each of secondary scanning movements of thermal head terminates. These white lines cause no trouble in the recording of letters and figures because letters and figures have no gradation. In a gradated image, however, such white lines cause a remarkable contrast between image elements of different densities. Such an image is hard to observe. This is fatal to the formation of a high-quality image. Especially, when thermal paper D is fed irregularly, white lines of inconstant width are formed. A recorded image having such white lines is commercially valueless.

SUMMARY OF THE INVENTION

An object of this invention is to provide a method of forming a gradated, recorded image which is free from white lines mentioned above.

According to this invention, the above object can be achieved by a method of forming a gradated image by using a thermal printer wherein a thermal head having a plurality of lined-up heating elements scans in one direction and the surface of thermal paper is fed in a secondary scanning direction intermittently and synchronously with the scanning movement of the thermal head, the method comprising the steps of setting a feed amount of the thermal paper to a level which is not greater than ½ of the length of arrangement of the heating elements and Y by which the thermal paper advances to the position where the sections formed between the preceding printing sections become the subsequent printing sections and giving new image element information to such heating elements that are not opposed to the sections formed between the preceding printing section of the thermal paper while giving to such heating elements that are opposed to the sections formed between the preceding printing section of the thermal paper image element information which is the same as the already-printed image element information in an adjacent heating element.

It has been ascertained that, when a gradated image is formed by inputting a video signal into a thermal printer, the density of image elements gradually increases as the formation of an image progresses and that, accordingly, the density of an image in an initial stage of a scanning operation and the density of the same image in a final stage of the scanning operation should be discussed separately.

According to the results of investigations made by the inventors, a phenomenon in which the density of image elements increases as a scanning operation progresses is ascribable to a heat transfer phenomenon occurring in a thermal head. In fact, the heat generated by heating elements B is transferred to a substrate A. As a scanning operation progresses, the temperature of the substrate A increases. Such an increase in the temperature of the substrate A causes an unexpected temperature rise in the heating elements B, or causes thermal paper D to be heated.

Therefore, another object of this invention is to provide a method of forming a gradated image, which permits preventing during the formation of an image the energy, which is applied to heating elements, from causing a temperature rise in a substrate of a thermal head.

According to this invention, the above object can be achieved by a method of forming a gradated image by using a thermal printer wherein a pulse current having a pulse width proportional to the density of an image is applied to a thermal head having a plurality of heating elements, the method comprising the step of modulating a signal representative of the density of an image to a plurality of pulse signals having a pulse width sufficiently smaller than the pulse width of the pulse current, so as to actuate the heating elements with the modulated signals.

The white lines referred to above can be eliminated by a so-called duplicating method in which, after thermal paper D has been subjected to a primary scanning operation, it is moved in the secondary scanning direction by a distance equal to ½ of an arrangement pitch of heating elements B, so as to subject the thermal paper D to a scanning operation again. However, when this method is employed, the image recording speed is increased double so that such a method has little practicality.

Therefore, still another object of this invention is to provide a thermal head for thermal printers, which permits eliminating white lines on a recorded image without increasing the image recording speed.

According to this invention, the above object can be achieved by a thermal head for thermal printers, having a plurality of heating elements provided on a substrate such that the heating elements are lined up in a secondary scanning direction, characterized in that the thermal head includes a plurality of auxiliary heating elements provided on the substrate such that the auxiliary heating elements are lined up in the secondary scanning direction and such that each of the auxiliary heating elements is positioned halfway between two adjacent heating elements, an image element signal which is identical with the image element signal in one of the nearest heating elements and which is staggered with respect to time from the image element signal in one of the nearest heating elements being input into the auxiliary heating elements.

The above and other objects as well as advantageous features of the invention will become apparent from the following description of the preferred embodiment taken in conjunction with the accompanying drawings.

DESCRIPTION OF THE PREFERRED EMBODIMENT

An embodiment of the present invention will be described with reference to the accompanying drawings.

Figure 1:
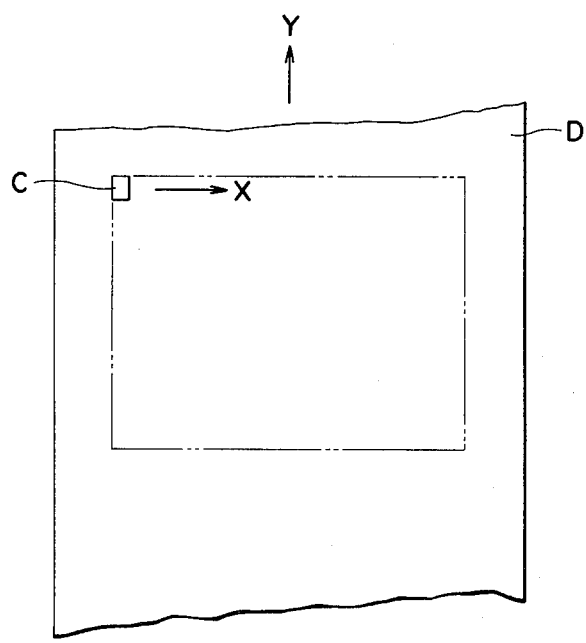
FIG. 1 is a plan view illustrating the relation in movement between a thermal printer and thermal paper.
Figure 2:
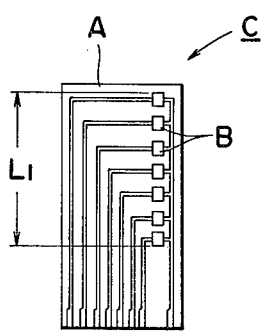
FIG. 2 is a plan view of a thermal head of the thermal printer shown in FIG. 1.
Figure 3:
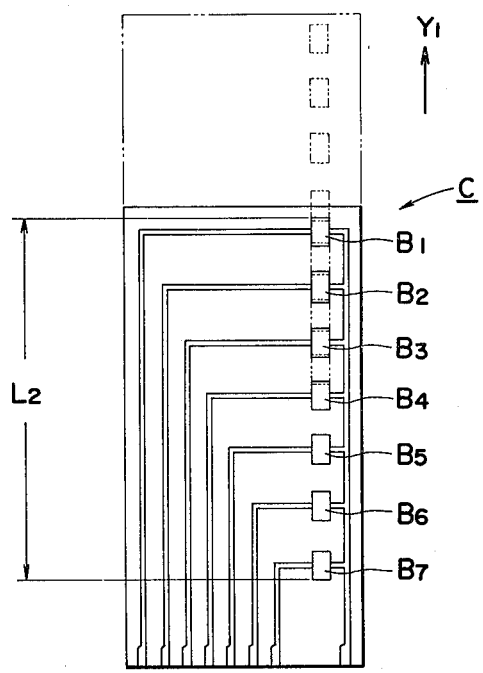
FIG. 3 is a plan view illustrating a method of forming a gradated image embodying the present invention.

Referring to FIG. 3, the present position of a thermal head C on thermal paper D is shown in full line, and the position in which the thermal head C was placed in the preceding scanning step in two-dot chain line.

As may be understood from the drawing, the secondary scanning distance for a thermal printer used in the present invention, or a feed amount $Y_1$ of thermal paper D, is set to a level which is not greater than $\frac{1}{2}$ of the length $L_2$ of arrangement of heating elements $B_1$–$B_7$ provided on a thermal head C and by which the thermal paper D advances to the position where the sections formed between the preceding printing sections (opposed to the heating elements $B_4$–$B_7$) become the subsequent printing sections (to be opposed to the heating elements $B_1$–$B_3$).

During a primary scanning operation according to the present invention, the same image element information that has been given to the heating elements $B_4$–$B_7$ in a preceding scanning step is given to the heating elements $B_1$–$B_4$ in a subsequent scanning step, and new image element information to the heating elements $B_5$–$B_7$ at the same time.

In order to carry out such a primary scanning operation, for example, a first memory for memorizing image element information for one scanning step by the heating elements $B_1$–$B_7$ and a second memory for memorizing the image element information which has been given to the heating elements $B_4$–$B_7$ in a preceding scanning step are prepared. The contents of the second memory are shifted to an address in the first memory, which corresponds to the heating elements $B_1$–$B_4$, every time one primary scanning step has been completed.

According to the present invention, when the current application time for the heating elements $B_1$–$B_7$ is limited in accordance with density information designated by an input video signal, the density of a recorded image is abnormally increased in some cases. It is self-evident that the heating elements $B_1$–$B_7$ may be actuated in such a case with a signal representative of $\frac{1}{2}$ of the density information represented by the video signal.

As may be clearly understood from the above description, a method according to the present invention permits eliminating parallel white lines, which occur due to spaces P between the heating elements B or irregular feeding of the thermal paper. Therefore, a high-quality gradated image can be formed by using a thermal printer.

Figure 4:
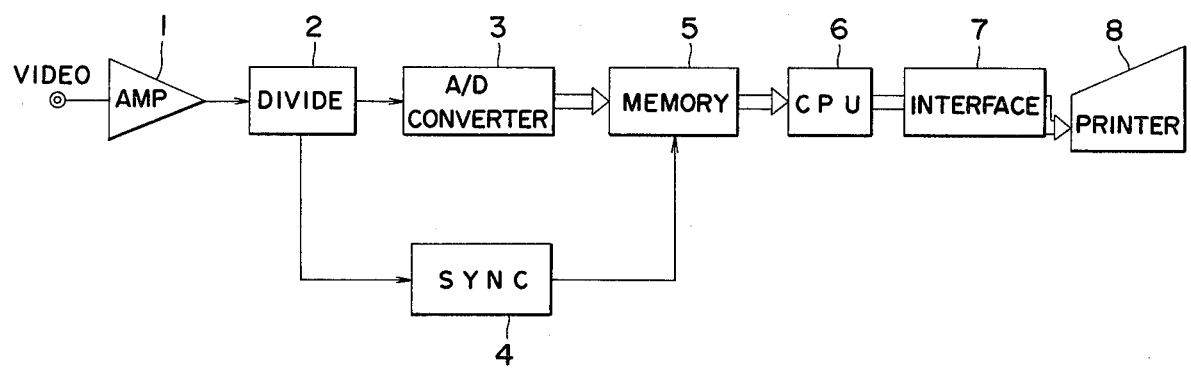
FIG. 4 is a block diagram of a signal processing circuit for a thermal printer used in the present invention.

FIG. 4 is a block diagram of a thermal printer used in the present invention. In this thermal printer, a video signal supplied thereto from, for example, a television image receiving unit or an output unit for computer tomography is amplified by an amplifier 1 and then divided into an image element signal and a synchronizing signal by a dividing circuit 2. When the image element signal consists of an analog signal, it is converted into a digital signal by an A/D converter 3. The digital signal is memorized in a memory 5 with a synchronizing signal from a synchronizing signal generator 4. The contents of the memory 5 are read out in order by an electronic computer 6 and supplied to a thermal printer 8 through an interface 7.

Figure 5:
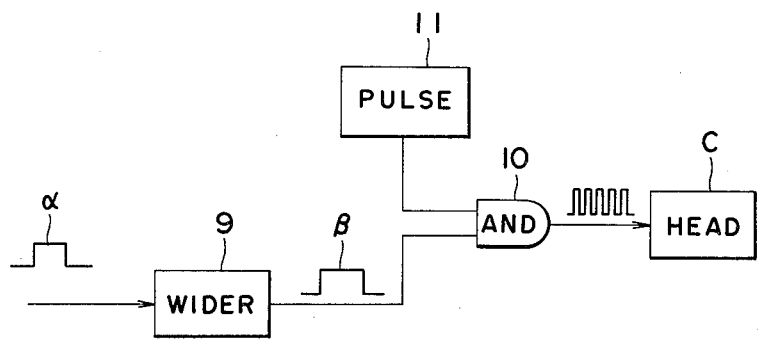
FIG. 5 is a block diagram of a thermal head actuating circuit for the thermal printer used in the present invention.

An image element signal $\alpha$ applied to each of the heating elements B is a pulse current having a pulse width as shown in FIG. 5, which is proportional to the density of an image element. In other words, an image element signal $\alpha$ is applied to a corresponding heating element B for a period of time in accordance with current application time therefor.

In the above embodiment of the present invention, an image signal $\alpha$ is input into a pulse width extender 9 to extend the width thereof at a certain rate, and the resulting pulse current $\beta$ is input as a gate signal into one of input terminals of an AND gate 10. An output signal from a pulse generator 11, which is adapted to generate a pulse signal having a pulse width sufficiently smaller than that of the image element signal $\alpha$, is applied to the other input terminal of the AND gate 10. Consequently, a signal obtained by modulating the image element signal $\alpha$ with an output from the pulse generator 11, and having an accumulative current application time equal to that of the image element signal, is output from the AND gate 10 into a thermal head C.

In this embodiment, an image element signal $\alpha$ is subjected to a pulse width extension by a pulse width extender 9. However, when a voltage to be applied to the thermal head C can be changed, the pulse width extender 9 may be omitted. In such a case, the thermal head C is actuated by increasing the voltage of an output signal from the pulse generator 11.

According to the above-described arrangement, an image, the density of which is not varied in initial and final stages of an image forming operation, can be obtained. The explanation is that, since a momentary pulse current is applied successively to heating elements B on a thermal head C, a difference in temperature between the heating element B and a substrate A occurs only momentarily, this allowing an amount of heat flowing from the heating elements B to the substrate A, to be kept smaller than that of heat radiated from the substrate, a temperature rise in the substrate A being thus prevented.

In short, the present invention permits recording a two-dimensional, gradated image free from variations in density, and thereby widening the application of a thermal printer.

The details of a thermal head embodying the present invention will be described with reference to FIG. 6.

Figure 6:
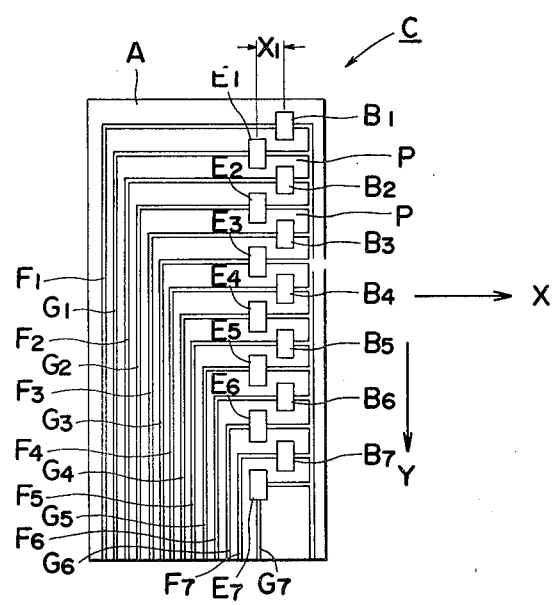
FIG. 6 is a plan view illustrating the details of a thermal head according to the present invention.

A thermal head according to the present invention shown in FIG. 6 is identical with a conventional thermal head in that a plurality of heating elements (seven heating elements in the embodiment shown in the drawing) $B_1-B_7$ are provided on a substrate A such that the heating elements are lined up in a secondary scanning direction Y. The thermal head according to the present invention is characterized in that a plurality of auxiliary heating elements $E_1-E_7$ are lined up in a secondary scanning direction Y such that the auxiliary heating elements $E_1-E_7$ are disposed adjacent to the heating elements $B_1-B_7$ with respect to a primary scanning direction and in opposition to spaces P between each of the heating elements $B_1-B_7$. In this embodiment, the auxiliary heating elements $E_1-E_7$ have the same size and shape as the heating elements $B_1-B_7$. The area and shape of these heating elements may be modified. The auxiliary heating elements $E_1-E_7$ have leads $G_1-G_7$ which are independent of leads $F_1-F_7$ of the heating elements $B_1-B_7$. Each of the leads are adapted to receive an image element density signal which has a time lag corresponding to a distance $X_1$ in a primary scanning direction X between the heating elements $B_1-B_7$ and auxiliary heating elements $E_1-E_7$ and which is identical with the signal input into the corresponding and closest one of the heating elements B.

Therefore, during the recording of a two-dimensional, gradated image with a thermal head according to the present invention, such portions of the surface of thermal paper that are opposed to spaces P between the heating elements $B_1-B_7$ are scanned by the auxiliary heating elements $E_1-E_6$, and such a portion of the surfaces of the thermal paper that is between a preceding image element and a subsequent image element by the auxiliary heating element $E_7$. Accordingly, a high-quality image having no white lines can be recorded. Moreover, a thermal head according to the present invention can be installed in a conventional thermal printer after the thermal head provided therein has been removed. Consequently, a thermal head according to the present invention can be used without changing the recording time, and permits a real time recording as well.

The present invention is not, of course, limited to the above embodiment; it may be modified in various ways within the scope of the appended claims.

What is claimed is:

1. In a method of forming a gradated image by using a thermal printer wherein a thermal head having a plurality of heating elements in aligned arrangement scans in one direction perpendicular to said aligned arrangement and the surface of thermal paper is fed in a secondary scanning direction intermittently and synchronously with the scanning movement of the thermal head, the method comprising the steps of: scanning with the thermal head while giving image element information proportional to image density to the heating elements to provide printing sections; feeding an amount of the thermal paper which is not greater than ½ of the length of said aligned arrangement of the heating elements whereby the thermal paper advances to a position where the sections formed between the preceding printing sections become subsequent printing sections; and again scanning with the thermal head while giving new image element information proportional to image density to such heating elements that are not opposed to the subsequent printing sections, and while giving to such heating elements that are opposed to the subsequent printing sections image element information proportional to image density which is the same as the already-printed image element information provided by an adjacent heating element.

2. In a method of forming a gradated image by using a thermal printer wherein a pulse current having a pulse width proportional to the density of an image is applied to a thermal head having a plurality of heating elements, the method comprising the steps of: modulating a signal representative of the density of an image to provide a plurality of pulse signals, the plurality of which exists within each pulse width of pulse current, each having a pulse width smaller than the pulse width of the pulse current, and applying said pulse signals so as to actuate the heating elements with the modulated signals.

3. A method of forming a gradated image on thermal paper by using a thermal printer wherein a thermal head has a plurality of heating elements in an aligned arrangement, said method comprising the steps of: moving the paper and the head relative to each other in a scanning direction while giving image element information proportional to image density to the heating elements to provide printing sections on the paper; moving the paper and the head relative to each other in a feed direction transverse to the scanning direction whereby sections between the printing sections become subsequent printing sections to which certain of the heating elements are opposed; and again moving the paper and the head relative to each other in the scanning direction while giving the same image element information to the certain heating elements as was previously given to form the printing sections, and while giving new image element information proportional to image density to the other heating elements.

* * * * *